(12) United States Patent
Kamiya

(10) Patent No.: US 7,242,312 B2
(45) Date of Patent: Jul. 10, 2007

(54) PRODUCT STATE DISPLAY SYSTEM, AND PROGRAM AND RECORDING MEDIUM FOR THE SAME

(75) Inventor: Tsuyoshi Kamiya, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 256 days.

(21) Appl. No.: 10/514,926

(22) PCT Filed: May 29, 2003

(86) PCT No.: PCT/JP03/06771

§ 371 (c)(1),
(2), (4) Date: Nov. 12, 2004

(87) PCT Pub. No.: WO03/100760

PCT Pub. Date: Dec. 4, 2003

(65) Prior Publication Data

US 2005/0231380 A1    Oct. 20, 2005

(30) Foreign Application Priority Data

May 29, 2002    (JP) .............................. 2002-156404

(51) Int. Cl.
G08B 3/00    (2006.01)
G08B 5/00    (2006.01)
G08B 7/00    (2006.01)

(52) U.S. Cl. .................. 340/691.2; 340/438; 340/439; 340/425.5

(58) Field of Classification Search ............ 340/691.2, 340/438, 439, 425.5

See application file for complete search history.

(56) References Cited

U.S. PATENT DOCUMENTS

| 6,249,720 B1 | 6/2001 | Kubota et al. |
| 6,411,898 B2 | 6/2002 | Ishida et al. |
| 6,437,689 B2 * | 8/2002 | Kawai et al. ............... 340/439 |
| 6,476,714 B2 * | 11/2002 | Mizuta ....................... 340/461 |

FOREIGN PATENT DOCUMENTS

EP    0 855 823    7/1998

(Continued)

OTHER PUBLICATIONS

International Preliminary Examination Report issued in corresponding International Application No. PCT/JP2003/006771; Filed May 29, 2003.

*Primary Examiner*—Jeffery Hofsass
*Assistant Examiner*—Samuel J. Walk
(74) *Attorney, Agent, or Firm*—Keating & Bennett, LLP

(57) ABSTRACT

A product state display system operates so that a person who looks at a pseudo living matter can easily understand the state of an industrial product at first glance in the case where the state of the product is represented by displaying the pseudo living matter. The pseudo living matter displayed on a display device shows both the "aging state" corresponding to the "progress state of time-dependent deterioration" of the industrial product within an endurance period and the facial expression corresponding to a "temporary state" of the industrial product. Accordingly, it is possible for a person who looks at the pseudo living matter to quickly and easily understand two states (progress state and temporary state) of the industrial product with just one glance.

14 Claims, 9 Drawing Sheets

FOREIGN PATENT DOCUMENTS

| | | |
|---|---|---|
| EP | 0 893 308 | 1/1999 |
| EP | 1 123 843 A2 | 8/2001 |
| JP | 56-133658 | 10/1981 |
| JP | 04-268413 | 9/1992 |
| JP | 07-027671 | 1/1995 |
| JP | 09-102098 | 4/1997 |
| JP | 11-250395 | 9/1999 |
| JP | 2001-219796 | 8/2001 |

* cited by examiner (a)

(b)

(c)

(a)

(b)

(c)

PRODUCT STATE DISPLAY SYSTEM, AND PROGRAM AND RECORDING MEDIUM FOR THE SAME

BACKGROUND OF THE INVENTION

1. Field of the Invention

The present invention relates to a product state display system for displaying a state of an industrial product, which has a changeable operating state, on a display device by use of a pseudo living matter, and relates to a program and a recording medium for the same.

2. Description of the Related Art

Previously, a device has been proposed in which a representation entity (hereinafter referred to as a "pseudo living matter") designed to resemble a person, an animal, an animation character, or the like is represented as a two-dimensional or three-dimensional image in a vehicle to notify a driver of information about the state and the like of the vehicle through the pseudo living matter (Japanese Unexamined Patent Publication No. 2001-219796).

The above-described state of the vehicle is a temporary state of the vehicle which has been detected by a fuel level sensor or the like, and is represented by using a pseudo living matter realized with an image of an animation character and by providing various facial expressions to the pseudo living matter.

According to the aforementioned Japanese Unexamined Patent Publication, a temporary state of a vehicle is represented by the facial expression of the pseudo living matter, so that a driver can recognize the state of the vehicle with the use of a more familiar image expressed by the pseudo living matter.

However, in the conventional display method, information that should be displayed by use of a scale or the like is simply replaced with the facial expression of the pseudo living matter to be represented. Accordingly, as in the case of the remaining amount of fuel or the like, when everyone can understand the state of the vehicle, there is no problem. However, when understanding the structure and the like of a product is required as in the case of the state of an engine, there arises the following problem: factors that reduce the endurance period (life) of the vehicle and that cause many failures are produced. That is, since not every driver can understand the structure of the engine and the meaning of a particular measured value, it is difficult for the drivers and the like to correctly understand whether the state of the vehicle is normal or abnormal, what kind of condition is or could become a problem, or the like, even if information which should be displayed by use of a scale or the like, is simply replaced with the facial expression of the pseudo living matter and the state of the vehicle can be thereby recognized with an image that is familiar. Accordingly, even when the conventional display method is used, the following problem cannot be solved: a driver unconsciously reduces the endurance period of the vehicle, or a factor that results in a failure is produced.

Moreover, although the conventional display method is suitable for the case where a condition that is temporary and can be restored by replenishment is represented, as in the case of fuel, the conventional display method is not suitable for representing a thing or condition which has an endurance period (life) and which is gradually deteriorated with time without the ability to be restored, once the thing has been deteriorated, as in the case of an engine, a lamp, or the like. This is because the facial expression of the pseudo living matter is displayed only at the beginning but is not displayed again.

Furthermore, the conventional display method provides a method for representing a piece of information indicating the state of the vehicle by use of different facial expressions of the pseudo living matter. Accordingly, a plurality of pieces of information cannot be simultaneously represented.

On the other hand, in Japanese Unexamined Patent Publication No. Hei 11(1999)-250395, an invention has been disclosed in which a plurality of states are simultaneously represented by two pseudo living matters (agents). According to this Japanese Unexamined Patent Publication, a plurality of pieces of information can be simultaneously provided to a driver by simultaneously displaying a main pseudo living matter and a helping pseudo living matter having a different appearance from that of the main pseudo living matter. However, when a plurality of pseudo living matters are simultaneously displayed, a person who looks at them cannot understand, at first glance, what states of a product are being represented. In particular, it is difficult for a driver of a vehicle to carefully look at a plurality of pseudo living matters while driving.

SUMMARY OF THE INVENTION

To solve the problems described above, preferred embodiments of the present invention display a pseudo living matter for causing even a person who does not understand the structure and the like of a product to understand the technical meaning of the state of the product. Further, preferred embodiments of the present invention display a pseudo living matter suitable for representing a thing which is gradually deteriorated over time without being restored once the thing is deteriorated. Moreover, preferred embodiments of the present invention enable a person who looks at a pseudo living matter to understand the state of a product at first glance in the case where the state of the product is represented by displaying the pseudo living matter.

In one aspect of preferred embodiments of the present invention, in order to achieve the above-described advantages, the facial expression of a pseudo living matter displayed on a display device corresponds to a temporary "loaded" state or a "trouble" condition of an industrial product. Accordingly, it is possible even for a person who does not understand the structure and the like of the product to understand the technical meaning of the state of the product by viewing something that is more familiar.

Moreover, in a second aspect of preferred embodiments of the present invention, a pseudo living matter displayed on a display device shows an "aging state" corresponding to the "progress state of time-dependent deterioration" of an industrial product within an endurance period, and is therefore suitable for representing a thing which is gradually deteriorated over time without the ability or possibility of being restored once the thing is deteriorated.

Furthermore, in a third aspect of preferred embodiments of the present invention, a pseudo living matter displayed on a display device shows both an "aging state" corresponding to the "progress state of time-dependent deterioration" of an industrial product within an endurance period and a facial expression corresponding to a "temporary state" of the industrial product. Accordingly, it is possible for a person who looks at the pseudo living matter to understand the two states (progress state and temporary state) of an industrial product at first glance.

A first preferred embodiment of the present invention provides a product state display system for displaying a state of an industrial product, of which an operating state is changeable, on a display device by using a pseudo living matter, the product state display system including a pseudo living matter data management unit for managing, in order to represent a temporary state of the industrial product by a facial expression of the pseudo living matter, data of a plurality of the pseudo living matters showing facial expressions corresponding to the temporary loaded state or a trouble condition, a state detector for detecting the temporary loaded state or the trouble of the industrial product, a pseudo living matter data readout unit for reading the data of the pseudo living matter showing the facial expression corresponding the temporary loaded state or the trouble detected by the state detector, out of the data of the plurality of pseudo living matters managed by the pseudo living matter data management unit, and a display unit for displaying the pseudo living matter showing the facial expression corresponding to the temporary loaded state or the trouble which has been detected, on the display device based on the read data of the pseudo living matter.

Here, the "industrial product" includes all kinds of things manufactured by a person or an apparatus. For example, in addition to computers, home electric appliances, daily necessities, and the like, movable bodies including airplanes, vehicles, ships, and the like are included. Further, not only completed products but also parts are included (the same is true in the aspects described below).

Moreover, the "pseudo living matter" is a representation entity which is designed to resemble a person, an animal, an animation character, or the like and which is represented as a two-dimensional or three-dimensional image on a display device, and includes plants and the like, which have no facial expressions in nature (the same is true in the aspects described below).

Further, the "product state display system" includes not only one which is built by use of one computer but also one which is built by use of two or more computers by dividing the system elements and steps (execution of steps, functionalization of the system elements), and the same is true in the aspects described below.

Furthermore, the "aging state" includes not only the state in which a young man ages toward an aged man but also the "growing state" in which a child or a boy grows toward a young man. The same is true in the aspects described below.

In another preferred embodiment of the present invention, a product state display system displays a state of an industrial product, of which an operating state is changeable, on a display device by using a pseudo living matter, the product state display system including a pseudo living matter data management unit for managing, in order to represent a progress state of time-dependent deterioration of the industrial product within an endurance period by an aging state of the pseudo living matter, data of a plurality of the pseudo living matters showing aging states corresponding to the progress state, a state determination unit for determining the progress state of the time-dependent deterioration of the industrial product, a pseudo living matter data readout unit for reading the data of the pseudo living matter showing the aging state corresponding to the progress state determined by the state determination unit, out of the data of the plurality of pseudo living matters managed by the pseudo living matter data management unit, and a display unit for displaying the pseudo living matter showing the aging state corresponding to the determined progress state, on the display device based on the read data of the pseudo living matter.

Another preferred embodiment of present invention provides a product state display system for displaying a state of an industrial product, of which an operating state is changeable, on a display device by using a pseudo living matter, the product state display system including a pseudo living matter data management unit for managing, in order to represent a progress state of time-dependent deterioration of the industrial product within an endurance period by an aging state of the pseudo living matter and to represent a temporary state of the industrial product by a facial expression of the pseudo living matter, data of a plurality of the pseudo living matters showing facial expressions corresponding to the temporary state for each aging state corresponding to the progress state, a state determination unit for determining the progress state of the time-dependent deterioration of the industrial product, a state detection unit for detecting the temporary state or a "trouble" condition of the industrial product, a pseudo living matter data readout unit for reading the data of the pseudo living matter which is in the aging state corresponding to the progress state determined by the state determination unit and which shows the facial expression corresponding to the temporary state detected by the state detection unit, out of the data of the plurality of pseudo living matters managed by the pseudo living matter data management unit, and a display unit for displaying the pseudo living matter which is in the aging state corresponding to the determined progress state and which shows the facial expression corresponding to the detected temporary state, on the display device based on the read data of the pseudo living matter.

Further, in the above-described preferred embodiment of the present invention, the temporary state of the industrial product is preferably a temporary loaded state or a trouble condition of the industrial product.

Further, the state determination unit preferably includes a progress degree estimation unit for estimating, based on the temporary loaded state of the industrial product detected by the state detection unit, a degree of progress of the time-dependent deterioration of the industrial product which has progressed due to the relevant temporary loaded state, a progress degree accumulation unit for accumulating the degree of the progress estimated by the progress degree estimation unit, and a progress state estimation unit for estimating the progress state of the time-dependent deterioration of the industrial product based on the total degree of the progress accumulated by the progress degree accumulation unit.

Further, the progress degree estimation unit refers to a relationship between the degree of the progress of the time-dependent deterioration of the industrial product and the temporary loaded state of the industrial product, which relationship has been previously set, and estimates the degree of the progress of the time-dependent deterioration based on the temporary loaded state of the industrial product.

Another preferred embodiment of the present invention provides a program for a product state display system for displaying a state of an industrial product, of which an operating state is changeable, on a display device by using a pseudo living matter, the program causes the product state display system to have the functions of a pseudo living matter data management unit for managing, in order to represent a temporary state of the industrial product by a facial expression of the pseudo living matter, data of a plurality of the pseudo living matters showing facial expressions corresponding to the temporary loaded state or a trouble condition, a state detection unit for detecting the temporary loaded state or the trouble of the industrial product, a pseudo living matter data readout unit for reading the data of the pseudo living matter showing the facial expression corresponding to the temporary loaded state or the trouble detected by the state detection unit, out of the data of the plurality of pseudo living matters managed by the pseudo living matter data management unit, and a display unit for displaying the pseudo living matter showing the facial expression corresponding to, the temporary loaded state or the trouble which has been detected, on the display device based on the read data of the pseudo living matter.

Here, the "program" in various preferred embodiments of the present invention includes sequenced rows of instructions which are suitable for a processing by a product state display system (computer), and includes software code installed on HDDs, CD-RWs, and the like of computers, ones recorded on various kinds of recording media, such as CD-ROMs, DVDs, FDs (floppy disks ("floppy" is a trademark)), semiconductor memories, HDDs of computers, and the like, and ones distributed through the Internet and the like (the same is true in the aspects described below).

According to another preferred embodiment of the present invention, a program is provided for a product state display system for displaying a state of an industrial product, of which an operating state is changeable, on a display device by using a pseudo living matter, the program causes the product state display system to have the functions of a pseudo living matter data management unit for managing, in order to represent a progress state of time-dependent deterioration of the industrial product within an endurance period by an aging state of the pseudo living matter, data of a plurality of the pseudo living matters showing aging states corresponding to the progress state, a state determination unit for determining the progress state of the time-dependent deterioration of the industrial product, a pseudo living matter data readout unit for reading the data of the pseudo living matter showing the aging state corresponding to the progress state determined by the state determination unit, out of the data of the plurality of pseudo living matters managed by the pseudo living matter data management unit, and a display unit for displaying the pseudo living matter showing the aging state corresponding to the determined progress state, on the display device based on the read data of the pseudo living matter.

Another preferred embodiment of the present invention provides a program for a product state display system for displaying a state of an industrial product, of which an operating state is changeable, on a display device by using a pseudo living matter, the program causes the product state display system to have the functions of a pseudo living matter data management unit for managing, in order to represent a progress state of time-dependent deterioration of the industrial product within an endurance period by an aging state of the pseudo living matter and to represent a temporary state of the industrial product by a facial expression of the pseudo living matter, data of a plurality of the pseudo living matters showing facial expressions corresponding to the temporary state for each aging state corresponding to the progress state, a state determination unit for determining the progress state of the time-dependent deterioration of the industrial product, a state detection unit for detecting any one of the temporary state and a trouble condition with the industrial product, a pseudo living matter data readout unit for reading the data of the pseudo living matter which is in the aging state corresponding to the progress state determined by the state determination unit and which shows the facial expression corresponding to the temporary state detected by the state detection unit, out of the data of the plurality of pseudo living matters managed by the pseudo living matter data management unit, and a display unit for displaying the pseudo living matter which is in the aging state corresponding to the determined progress state and which shows the facial expression corresponding to the detected temporary state, on the display device based on the read data of the pseudo living matter.

Further, the temporary state of the industrial product described above is preferably a temporary loaded state or a "trouble" condition of the industrial product.

Further, the state determination unit preferably causes the product state display system to have the functions of a progress degree estimation unit for estimating, based on the temporary loaded state of the industrial product detected by the state detection unit, a degree of progress of the time-dependent deterioration of the industrial product which has progressed due to the relevant temporary loaded state, a progress degree accumulation unit for accumulating the degree of the progress estimated by the progress degree estimation unit, and a progress state estimation unit for estimating the progress state of the time-dependent deterioration of the industrial product based on the total degree of the progress accumulated by the progress degree accumulation unit.

Further, the progress degree estimation unit refers to a relationship between the degree of the progress of the time-dependent deterioration of the industrial product and the temporary loaded state of the industrial product, which relationship has been previously set, and estimates the degree of the progress of the time-dependent deterioration based on the temporary loaded state of the industrial product.

The recording media described with reference to various preferred embodiments of the present invention are preferably recording media for a product state display system. The recording media are readable by the product state display system and, on the recording media, the programs for the product state display system of the above-described preferred embodiments of the present invention are recorded.

Here, a "recording medium" should be used for reading a program for realizing each process in a product state display system (computer), but does not depend on a physical recording method, such as how information is recorded by utilizing physical characteristics of the medium. For example, FDs, CD-ROMs (R and RW), DVD-ROMs (RAM, R, and RW), semiconductor memories, MOs, MDs, magnetic tapes, and the like apply.

Other features, elements, steps, characteristics and advantages of the present invention will become more apparent from the following detailed description of preferred embodiments thereof with reference to the attached drawings.

DETAILED DESCRIPTION OF PREFERRED EMBODIMENTS

Hereinafter, preferred embodiments of the present invention will be described using the drawings.

Figure 1:
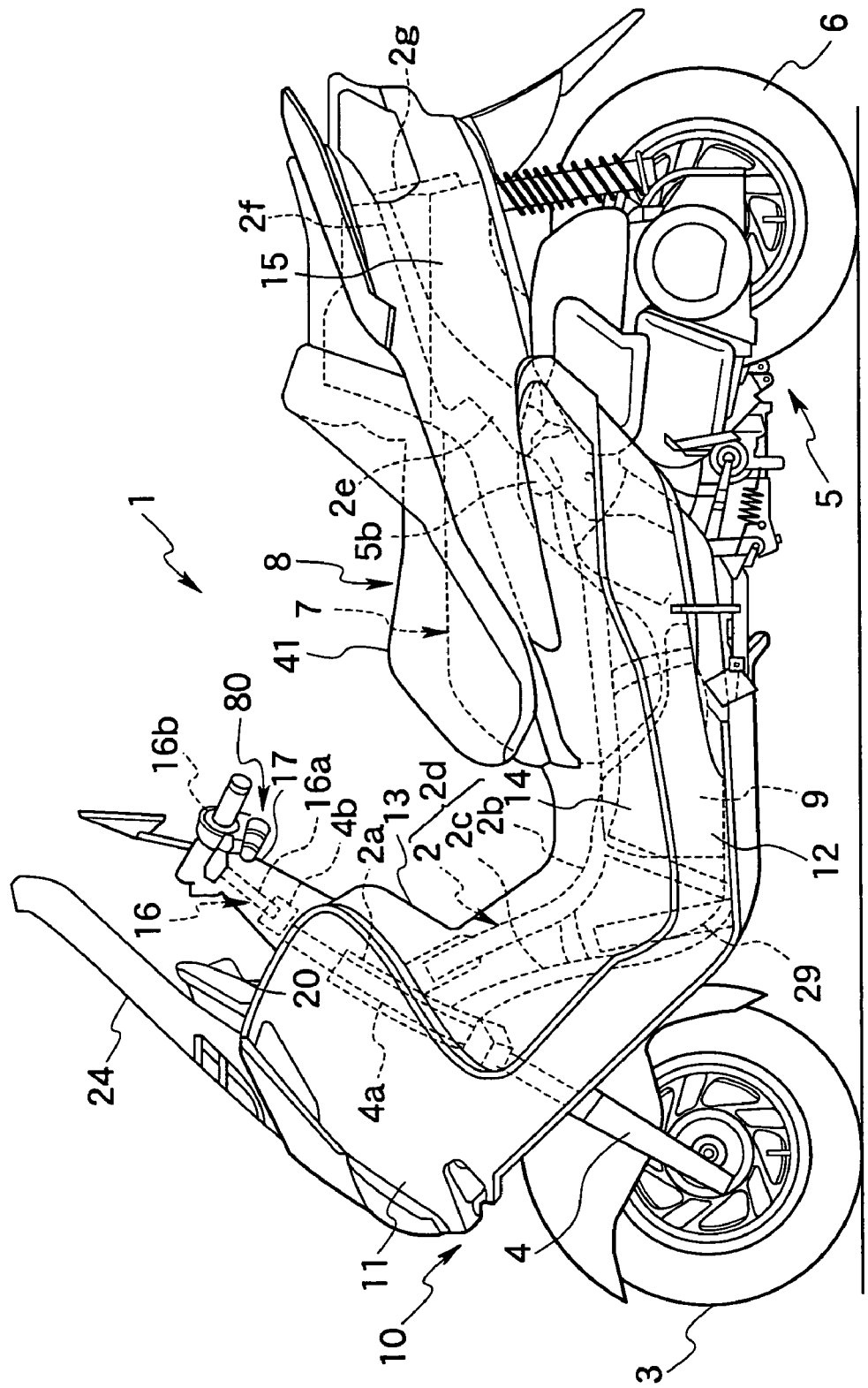
FIG. 1 is a left side view of a two-wheeled motor vehicle according to a preferred embodiment of the present invention.
Figure 2:
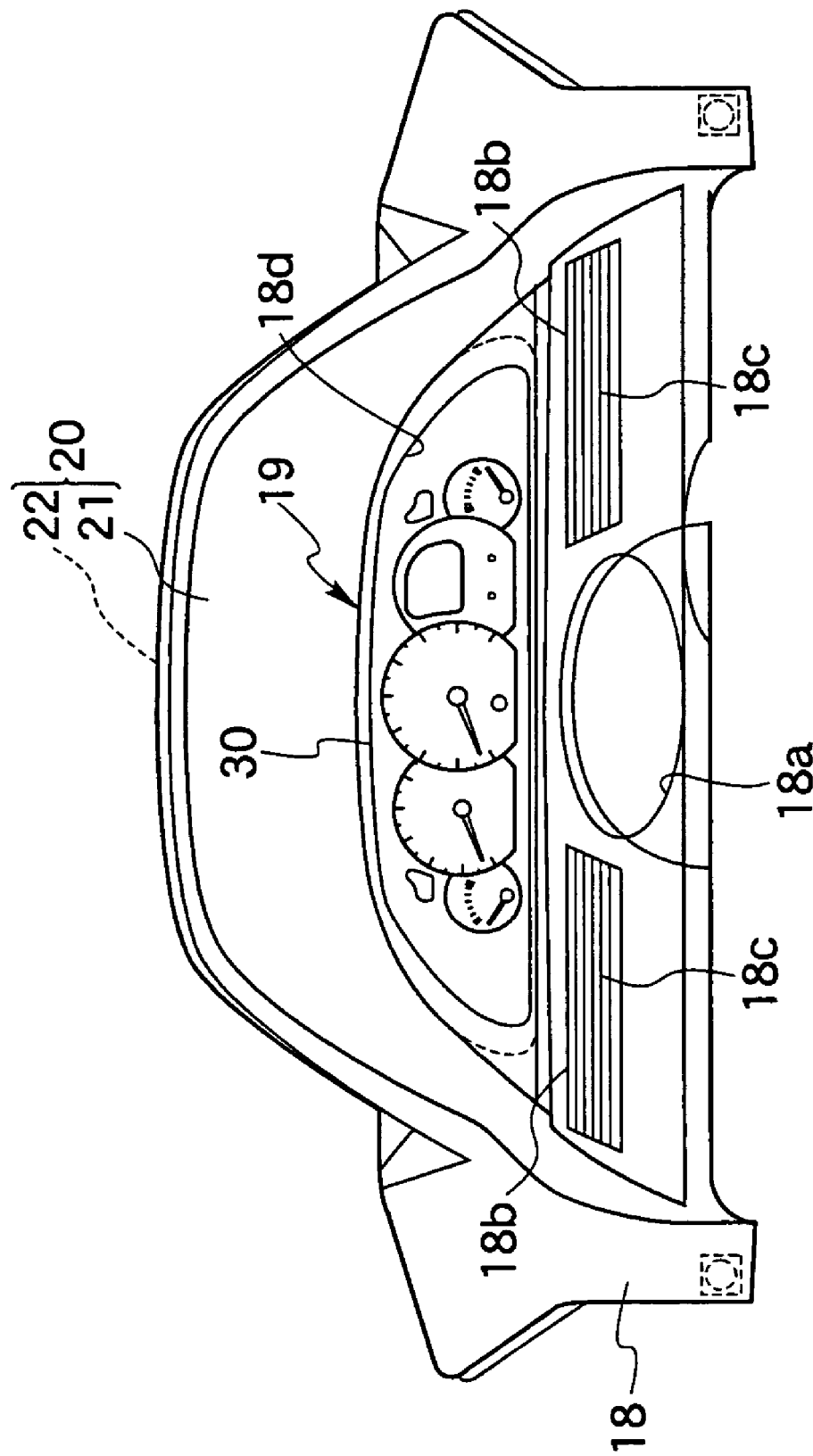
FIG. 2 is a rear view showing a meter panel and the surroundings thereof of a vehicle body cover according to a preferred embodiment of the present invention.
Figure 3:
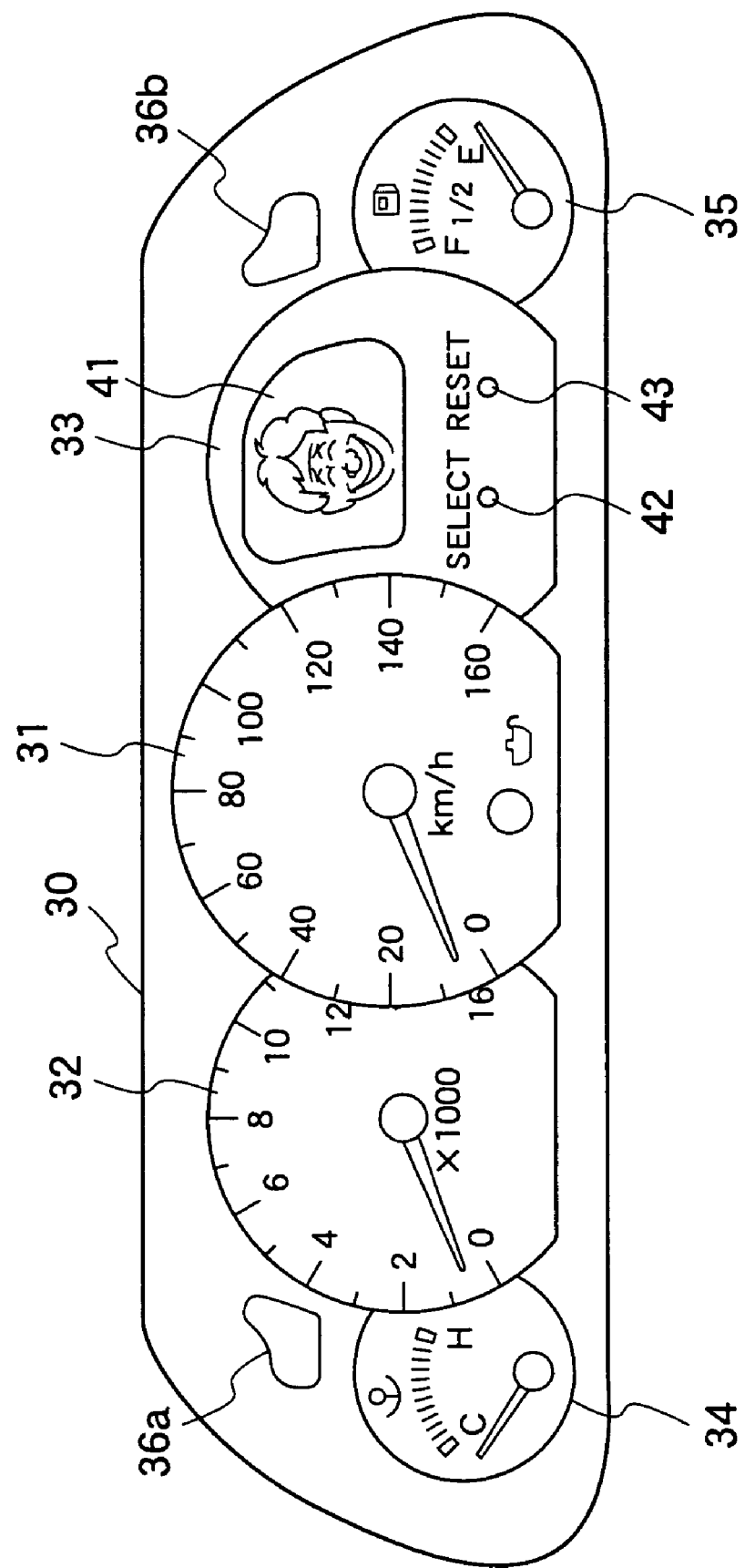
FIG. 3 is a view showing the meter panel according to a preferred embodiment of the present invention.

FIG. 1 is a left side view of a two-wheeled motor vehicle according to a preferred embodiment of the present invention. FIG. 2 is a rear view showing a meter panel and the surroundings thereof of a vehicle body cover. FIG. 3 is a view showing the meter panel.

In FIG. 1, reference numeral 1 denotes a scooter-type two-wheeled motor vehicle, which is an example of a product according to preferred embodiments of the present invention. This two-wheeled motor vehicle 1 preferably has the following schematic structure: a front fork 4, at the lower end of which a front wheel 3 is pivotally supported by the front end of a vehicle body frame 2 so as to allow steering to the left and the right; a unit-swing engine 5 is supported by the rear of the vehicle body frame 2 so as to be able to vertically swing; a rear wheel 6, which is placed inside of the rear end of the engine 5, is pivotally supported at the rear end thereof; a container device 7 is placed above the engine 5; a seat device 8 is mounted on the container device 7; a fuel tank 9 and a radiator 29 are mounted in this order in front of the engine 5; and the vehicle body frame 2 is surrounded by the vehicle body cover 10 made of resin.

Further, the vehicle body frame 2 preferably has the following schematic structure: the front ends of left and right side frames 2d are connected to a kingpin tube 2a, which pivotally supports a kingpin 4a of the front fork 4; left and right grip support members 2f are fixed to the top ends of left and right main brackets 2e extending from the rear ends of the left and right side frames 2d backward and obliquely upward; and the left and right grip support members 2f are coupled to each other by a rear frame 2g, which is almost U-shaped in view from the rear. Incidentally, in each of the left and right side frames 2d, upper and lower side pipes 2b and 2c are arranged so as to have a two-stage almost L-shaped form as viewed from the side, and the rear ends of these are connected to each other through the main bracket 2e.

Moreover, the kingpin 4a, which is vertically placed in the middle of the front fork 4 in the vehicle width direction to extend upward, is pivotally supported through a bearing by the kingpin tube 2a, which is at the front end of the vehicle body frame 2, so as to allow steering to the left and the right. The middle portion 16a of a steering handle 16 is detachably fixed to the top end of the kingpin 4a through a handle bracket 4b by a bolt. The steering handle 16 has the middle portion 16a, which is preferably made of a round steel pipe and almost horizontally extends, and a left portion 16b and a right portion (not shown), which rise from the left and right ends of the middle portion 16a outward and obliquely upward and almost horizontally extend. A handle cover 17 made of resin is attached so as to surround the middle portion 16a and the left and right inclined portions of the steering handle 16. The handle cover 17 rotates with the steering handle 16.

Further, the vehicle body cover 10 has a cowling 11 for covering the vicinity of the rear of the front wheel 3 from the front of the kingpin 4a, an undercover 12 for covering the left and right lower portions of the vehicle body subsequently to the foregoing, a leg shield 13 for covering the rear of the kingpin 4a, a footboard 14 constituting a footrest section, and side covers 15 for covering the left and right portions of the seat device 8.

Further, as shown in FIG. 2, an inner panel 18 made of resin is attached to the opening surrounded by the upper edge of the cowling 11 and the upper edge of the leg shield 13 so as to block the opening. A handle opening 18a, into which the handle bracket 4b at the top end of the kingpin 4a is inserted, is formed in the middle of the inner panel 18 in the vehicle width direction. Grid portions 18b are formed on the left and right of the handle opening 18a. These grid portions 18b are made by forming a plurality of slits 18c in the inner panel 18 so as to extend in the horizontal direction. Speakers of a stereo unit are placed inside the grid portions 18b.

Moreover, a meter opening 18d is formed in front of the handle opening 18a and the grid portions 18b of the inner panel 18. As shown in FIG. 3, a meter panel 30, in which meters including a speedometer 31, a tachometer 32, a switchable tripmeter 33, a water temperature gauge 34, a fuel gauge 35, left and right direction indicator display units 36a and 36b and the like are unitized, is fixedly placed in the meter opening 18d. Furthermore, a multi-display unit 41, a select (SELECT) button 42, and a reset (RESET) button 43 are fixedly placed in the switchable tripmeter 33.

The multi-display unit 41 is preferably a transmissive liquid crystal display device. On the multi-display unit 41, a pseudo living matter can be displayed by a product state system (hereinafter referred to as "system") 50 to be described later. Further, display switching between a pseudo living matter display screen and an odometer/tripmeter display screen can be performed by pushing the select button 42. Furthermore, the tripmeter can be reset by pushing the reset button 43.

Moreover, a meter visor 20, which prevents light from the front from directly striking dials of the meter panel 19 and which functions as a guide member for guiding wind or air, is placed in front of the meter panel 19 of the inner panel 18.

Further, a large screen (windshield plate) 24 is attached to the top end of the front surface of the cowling 11 to be slightly less inclined than the meter visor 20 (to make a slightly smaller angle with the vertical line than the meter visor 20) when the cross section in the middle in the vehicle width direction is viewed from the side of the vehicle.

Next, using FIG. 4, the functional structure of the system 50 for displaying a pseudo living matter on the multi-display unit 41 will be described. Incidentally, in the present preferred embodiment, a functional structure for displaying the state of the engine 5, as an example of an industrial product, on the multi-display unit 41 by use of a pseudo living matter, will be described. However, the present invention is in no way limited to this example. Further, the system 50 is preferably built by using a computer, and can execute each step (S1 to S6) to be described later by means of a program (p).

Figure 4:
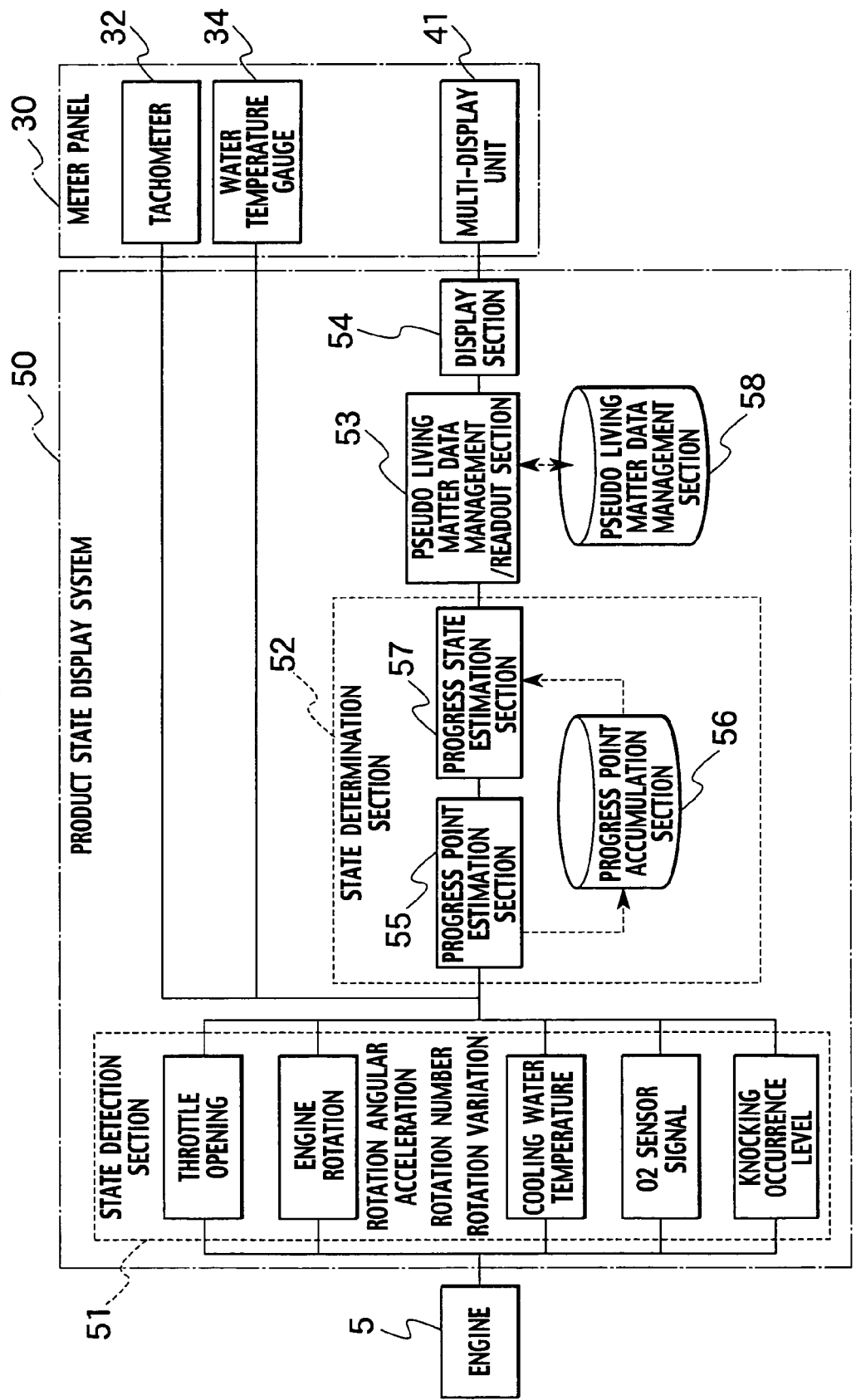
FIG. 4 is a functional structure diagram of a system according to a preferred embodiment of the present invention.

As shown in FIG. 4, functions of the system 50 are constituted by a state detection section 51 configured to detect a temporary loaded state of the engine 5, a state determination section 52 configured to determine the progress state of time-dependent deterioration of the engine 5, a pseudo living matter data management/readout section 53 configured to manage and read pseudo living matter data, and a display section 54 configured to display a pseudo living matter based on the read pseudo living matter data on the multi-display unit 41.

The state detection section 51 detects a temporary loaded state of the engine based on various kinds of information (throttle opening, engine rotation (rotation angular acceleration, rotation number, rotation variation), cooling water temperature, $O_2$ sensor signal, knocking occurrence level, and the like) transmitted from sensors and the like for detecting the operating state of the engine 5.

Further, the state determination section 52 determines the progress state of time-dependent deterioration of the engine 5. This state determination section 52 has a progress point estimation section 55 configured to estimate, based on the temporary loaded state of the engine 5 which has been detected by the state detection section 51, the progress point (degree) of time-dependent deterioration of the engine 5 which has progressed due to this temporary loaded state; a progress point accumulation section 56 configured to accumulate the progress point estimated by the progress point estimation section 55; and a progress state estimation section 57 configured to estimate the progress state of time-dependent deterioration of the engine 5 based on the total progress point accumulated in the progress point accumulation section 56. Note that the progress point accumulation section 56 is a partial storage area of a memory, such as a hard disk drive (HDD), which is built in the system 50.

Figure 5:
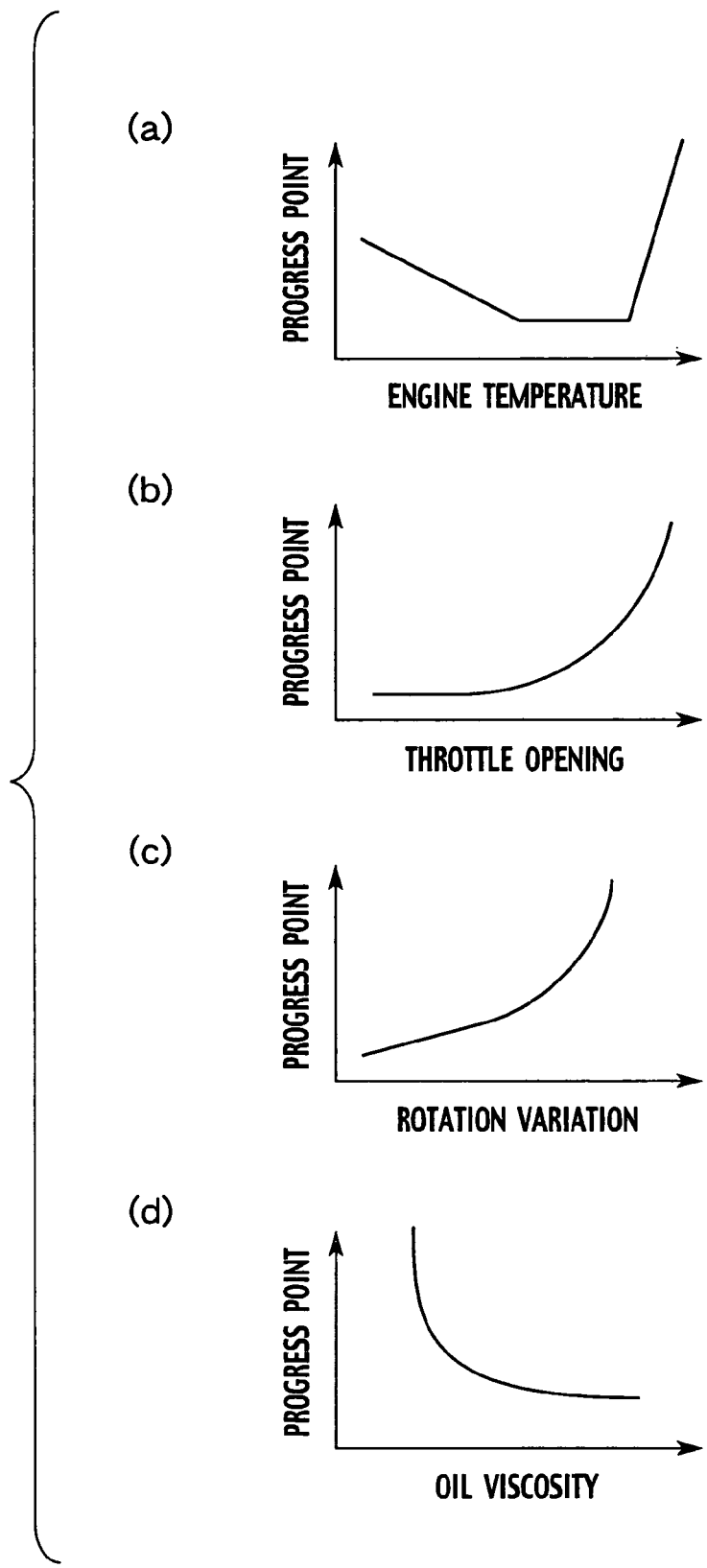
FIGS. 5(a)-(d) are graphs, each showing the relationship between the progress point of time-dependent deterioration of an engine and a temporary loaded state of the engine.

Furthermore, as shown in FIGS. 5(a)-(d), the progress point estimation section 55 refers to the relationship between the progress point of time-dependent deterioration of the engine 5 and the temporary loaded state of the engine 5, which relationship has been previously set by the manufacturer, and estimating the progress point of time-dependent deterioration based on the temporary loaded state of the engine 5. In FIGS. 5(a)-5(d), as examples of the temporary loaded state, engine temperature shown in FIG. 5(a), throttle opening shown in FIG. 5B(b), rotation variation shown in FIG. 5(c), and oil viscosity shown in FIG. 5(d) are shown. For example, in the case of engine temperature, as shown in FIG. 5(a), the setting is as follows: the progress point of time-dependent deterioration is high when the engine temperature is low, the progress point decreases as the temperature increases, and the progress point sharply increases when the engine temperature becomes high. This indicates the following: the progress point of time-dependent deterioration is high in the case of starting the engine before it gets warm, the progress point is low in the state where the engine is warm, and the progress point sharply increases when the engine is brought to full power to get warm.

Figure 6:
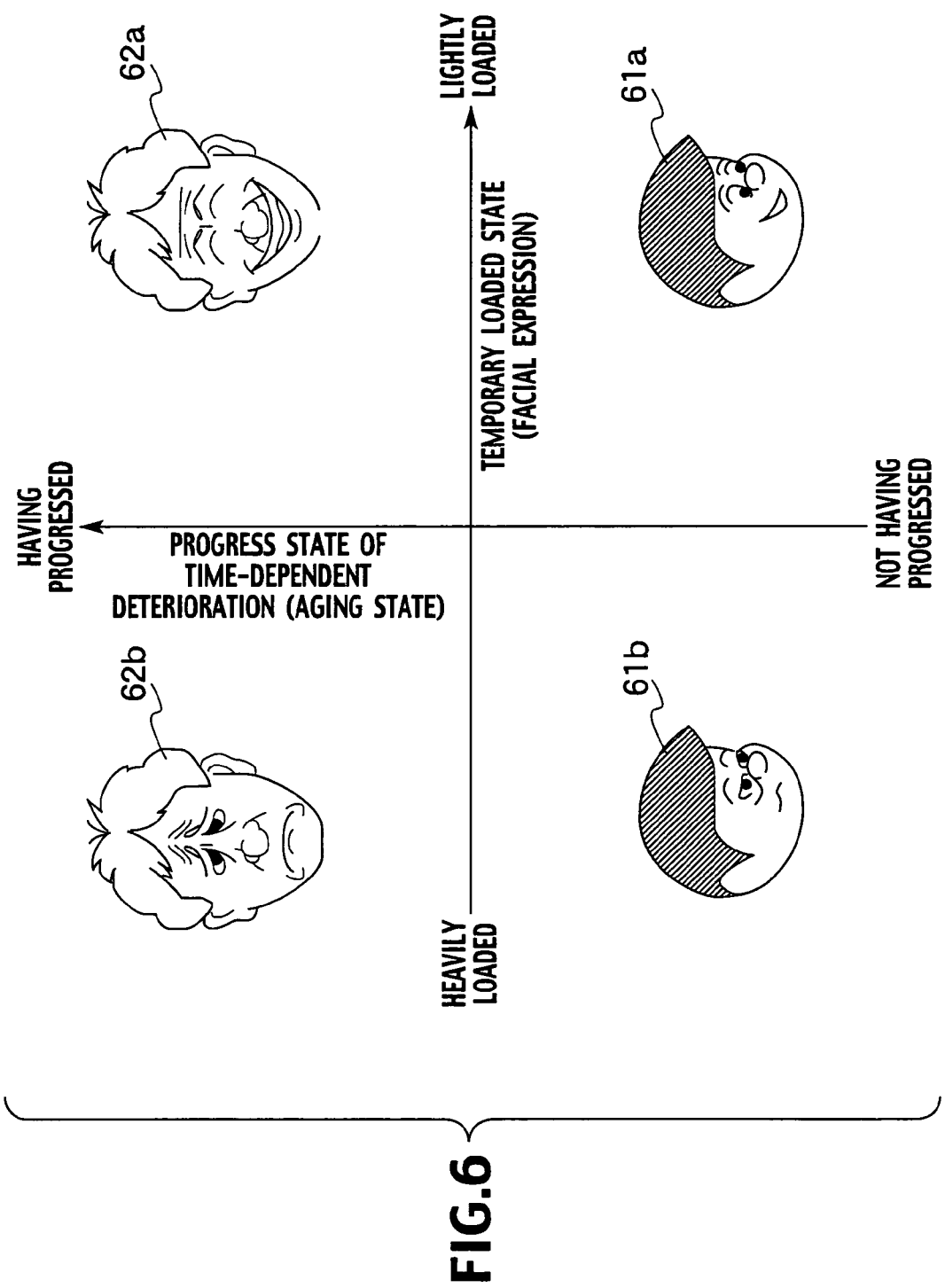
FIG. 6 is a view of various pseudo living matters, each of which has a face simultaneously showing an aging state (e.g., boy or middle-aged man) and an expression (e.g., smiley or angry).

Moreover, the pseudo living matter data management/readout section 53 has the functions of previously storing pseudo living matter data in a pseudo living matter data management section 58, which is a partial storage area of a memory, such as an HDD, built in the system 50, managing the pseudo living matter data, and reading, from the pseudo living matter data management section 58, the pseudo living matter data corresponding to the progress state of time-dependent deterioration of the engine 5 which has been determined by the state determination section 55. As shown in FIG. 6, pseudo living matters according to the pseudo living matter data stored on the pseudo living matter data management section 58 are pseudo living matters 61a, 61b, 62a, and 62b, which have faces each preferably simultaneously representing an aging state (e.g., boy or middle-aged man) and a qualitative expression (e.g., smiley or angry).

The pseudo living matters 61a and 61b represent the face of a boy, and are read out and displayed in the case where the state determination section 52 has determined that the time-dependent deterioration of the engine 5 has progressed to a relatively low degree. The pseudo living matters 62a and 62b represent the face of a middle-aged man, and are read out and displayed in the case where the state determination section 52 has determined that the time-dependent deterioration of the engine 5 has progressed to a relatively high degree.

On the other hand, the pseudo living matters 61a and 62a represent smiley facial expressions, and are read out and displayed in the case where the state detection section 51 has detected that the engine 5 is relatively lightly loaded. The pseudo living matters 61b and 62b represent angry facial expressions, and are read out and displayed in the case where the state detection section 51 has detected that the engine 5 is relatively heavily loaded.

Accordingly, if the engine 5 is relatively new and a temporary loaded state is low when the detection result by the state detection section 51 and the determination result by the state determination section 52 are combined, the pseudo living matter 61a is read out and displayed; if the engine 5 is relatively new but a temporary loaded state is high, the pseudo living matter 61b is read out and displayed. Moreover, if the engine 5 is relatively old but a temporary loaded state is low, the pseudo living matter 62a is read out and displayed; if the engine 5 is relatively old and a temporary loaded state is high, the pseudo living matter 62b is read out and displayed.

Figure 7:
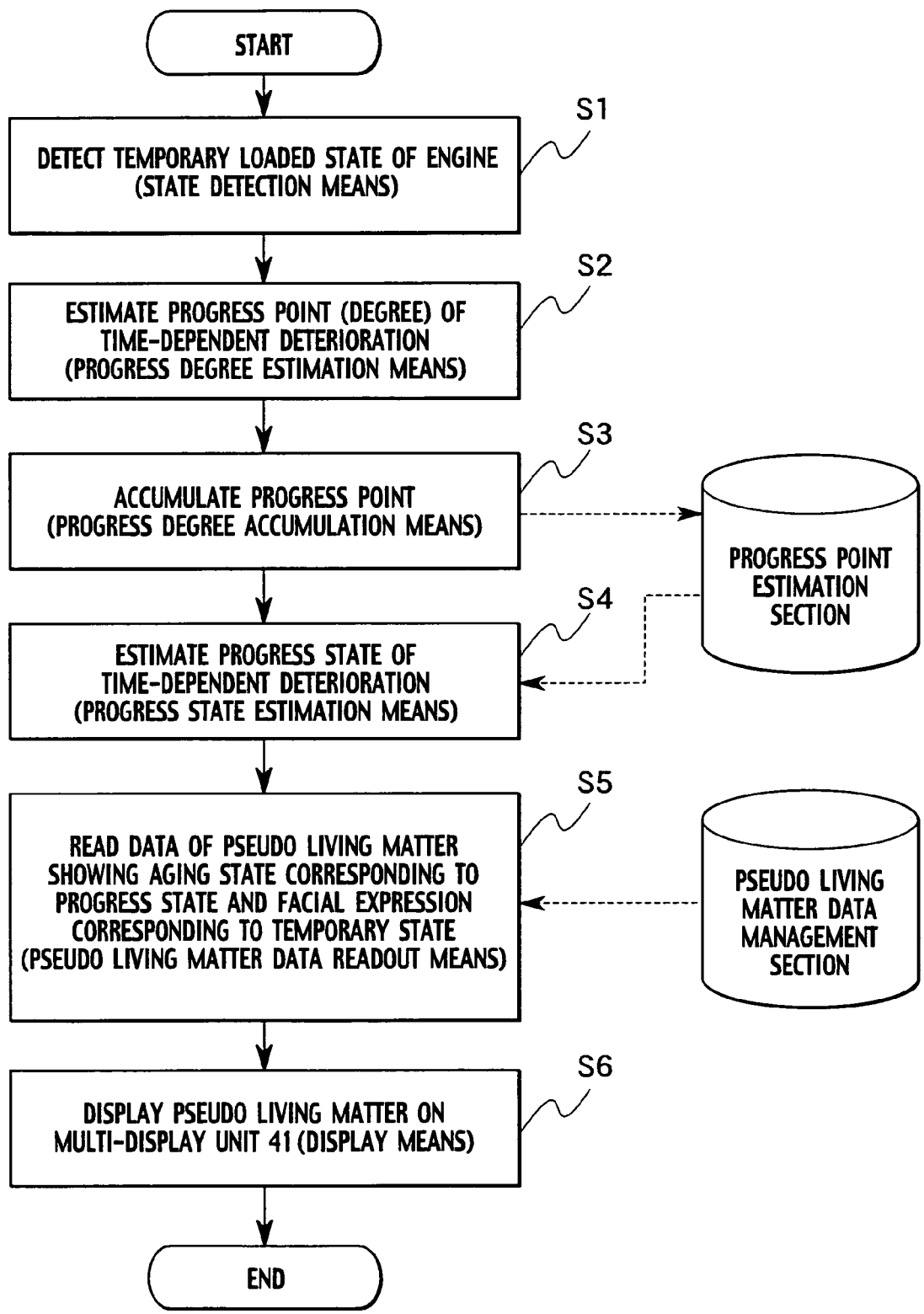
FIG. 7 is a flowchart showing a method of displaying a pseudo living matter according to a preferred embodiment of the present invention.

Next, using the flowchart shown in FIG. 7, a method of displaying a pseudo living matter on the multi-display unit 41 of the meter panel 30 by utilizing the system 50 according to the present preferred embodiment will be described.

First, after the engine 5 of the two-wheeled motor vehicle is started, the temporary loaded state of the engine 5 is detected by the state detection section 51 (step S1). This temporary loaded state is detected based on throttle opening, engine rotation, cooling water temperature, $O_2$ sensor signal, knocking occurrence level, and the like, as described previously. This detection result is utilized by the state determination section 52. Moreover, engine rotation information is reflected in the operation of the tachometer 32, and cooling water temperature information is reflected in the operation of the water temperature gauge 34.

Next, in the progress point estimation section 55, based on the temporary loaded state of the engine 5 that has been detected by the state detection section 51, the progress point (degree) of time-dependent deterioration of the industrial product that has progressed due to this temporary loaded state is estimated (step S2). This estimation of the progress point is performed based on the temporary loaded state of the engine 5 by referring to the relationship between the degree of progress of time-dependent deterioration of the engine 5 and the temporary loaded state of the engine 5, which relationship has been previously set by the manufacturer as shown in FIGS. 5(a)-(d). Then, the estimated progress point is stored on the progress point accumulation section 56 and accumulated therein (step S3).

Subsequently, in the progress state estimation section 57, based on the total progress point accumulated in the progress point accumulation section 56, the progress state of time-dependent deterioration of the engine 5 is estimated (step S4).

After that, the pseudo living matter data management/readout section 53 reads, out of the plurality of bits of pseudo living matter data managed in the pseudo living matter data management section 58, the data of the pseudo living matter which is in the aging state corresponding to the progress state determined by the state determination section 52 and which shows the facial expression corresponding to the temporary state detected by the state detection section 51 (step S5). Then, based on the pseudo living matter data read in step 5, the display section 54 displays, on the multi-display unit 41, the pseudo living matter which is in the aging state corresponding to the progress state determined by the state determination section 52 and which shows the facial expression corresponding to the temporary loaded state detected by the state detection section 51 (step S6). Note that part of the above-described steps or a detailed process in each step may be omitted as long as the effects and advantages of the present preferred embodiment to be described below are achieved.

As described above, according to the present preferred embodiment, the facial expression of the pseudo living matter displayed on the multi-display unit 41 corresponds to the temporary "loaded" state of the engine 5. Accordingly, it is possible even for a person who does not understand the structure and the like of the product to understand the technical meaning of the state of the product by viewing a familiar, easily understandable facial expression of the pseudo living matter.

Further, according to the present preferred embodiment, the pseudo living matter displayed on the multi-display unit 41 shows the "aging state" corresponding to the "progress state of time-dependent deterioration" of the engine 5 within an endurance period, and is therefore suitable for representing a thing that is gradually deteriorated with time and that cannot be restored once the thing is deteriorated.

Moreover, according to the present preferred embodiment, the pseudo living matter displayed on the multi-display unit 41 shows both the "aging state" corresponding to the "progress state of time-dependent deterioration" of the engine 5 within the endurance period and the facial expression corresponding to the "temporary state" of the engine 5. Accordingly, it is possible for a person who looks at the pseudo living matter to understand the two states (progress state and temporary state) of the engine 5 at first glance. In particular, since two states are simultaneously displayed, the driver of a movable body, such as a vehicle, can understand the state of the vehicle at first glance even if the driver does not carefully look at the pseudo living matter display unit 102' while driving. Thus, it is possible to drive safely.

Furthermore, according to the present preferred embodiment, the progress state of time-dependent deterioration within the endurance period is not simply represented by the elapsed time but represented in accordance with the temporary loaded state of the engine 5. Accordingly, for example, in the case where the temporary loaded state is high, expression can be made such that time-dependent deterioration progresses regardless of the elapsed time. Meanwhile, in the case where the temporary loaded state is low, expression can be made such that time-dependent deterioration does not progress.

OTHER PREFERRED EMBODIMENTS (1-1) In the above-described preferred embodiment, as shown in FIG. 6, expression has been made using the face of a person as an example of a pseudo living matter. However, the expression is not limited to this, and may be made using the upper or whole body of a person. Further, as a method of representing age, expression may be made using a body shape, wrinkles, spots, a face shape, skin radiance, a hair style, hair color, a hair volume, or the like. Moreover, a pseudo living matter may be represented as moving images, whereby a faster speed of actions represents that the pseudo living matter is younger. Furthermore, a pseudo living matter may be displayed as a three-dimensional image.

(1-2) Further, the progress state of time-dependent deterioration has been divided into two stages, such as a boy and a middle-aged man, in the aforementioned preferred embodiment, but the present invention is not limited to this. The progress state of time-dependent deterioration may be divided into three stages or four or more stages, such as a boy, a middle-aged man, and an aged man. In addition, the facial expression thereof may be divided into three or more stages.

Figure 8:
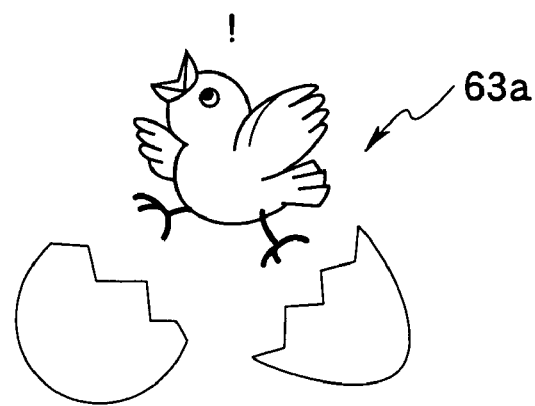
FIGS. 8(a)-(c) are views showing other examples of pseudo living matters.
Figure 8:
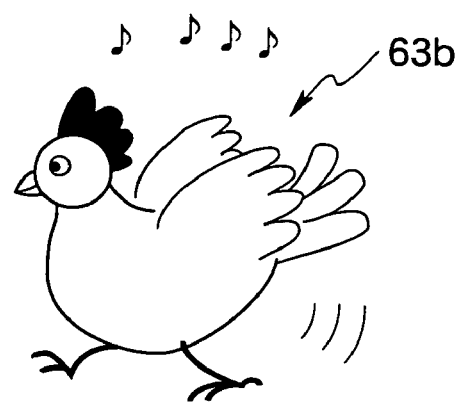
Figure 8:
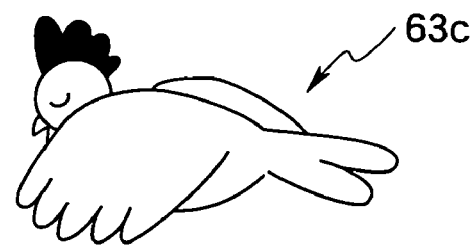

(1-3) Moreover, as shown in FIGS. 8(*a*)-8(*c*), expression may be made using an animal instead of a person. The pseudo living matters of this case represent a chick 63*a* (FIG. 8(*a*)), a chicken 63*b* (FIG. 8(*b*)), and an old chicken 63*c* (FIG. 8(*c*)).

Figure 9:
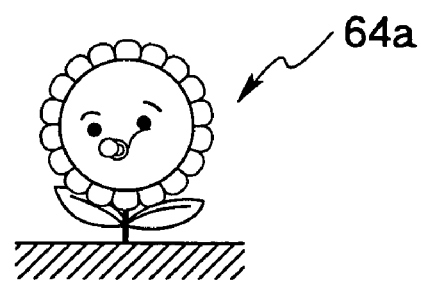
FIGS. 9(a)-(c) are views showing other examples of pseudo living matters.
Figure 9:
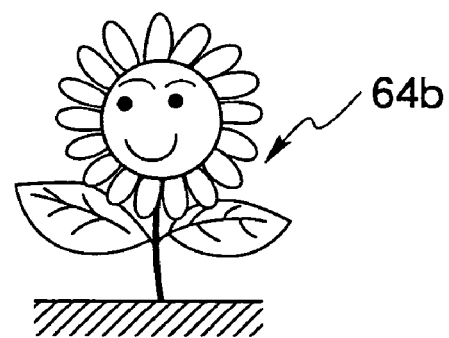
Figure 9:
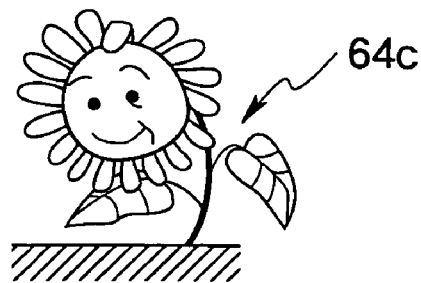

(1-4) Furthermore, as shown in FIGS. 9(*a*)-9(*c*), expression may be made using a plant instead of an animal. The pseudo living matters of this case represent a before-full-bloom sunflower 64*a* (FIG. 9(*a*)), a full-blown sunflower 64*b* (FIG. 9(*b*)), and an overblown sunflower 64*c* (FIG. 9(*c*)). Thus, the "progress state of time-dependent deterioration" and "temporary state" of the engine 5 can be simultaneously represented by a simulation displaying a facial expression on a plant or the like, which has no facial expressions in nature.

(2-1) Moreover, in the aforementioned preferred embodiment, the progress state of time-dependent deterioration and the temporary loaded state of the engine 5 have been represented by the aging state and the facial expression of a pseudo living matter. However, the expression is not limited to this and may be made using sound. For example, the voice of an aged man is used in the case where time-dependent deterioration has progressed, and the voice of a child is used in the case where time-dependent deterioration has not progressed. Further, a sentence, such as "it's tough," "it's hard," or the like, is used in the case where the temporary loaded state is high, and a sentence, such as "it's easy" or the like, is used in the case where the temporary loaded state is low. Furthermore, it is possible to combine them. For example, in the case where the time-dependent deterioration of the engine 5 has progressed and the temporary loaded state of the engine 5 is low, the sentence "it's easy" in the voice of an aged man is used.

(2-2) In addition, the progress state of time-dependent deterioration may be represented by the speed at which a sentence is spoken. For example, the speed of speaking is increased in the case where time-dependent deterioration has not progressed, and the speed of speaking is reduced in the case where time-dependent deterioration has progressed. Further, in the case where the temporary loaded state is high, expression may be made using the sound of screaming or the like.

(3-1) Moreover, in the aforementioned preferred embodiment, the temperature and the like of the engine have been taken as examples of temporary loaded states. However, temporary loaded states are not limited to these. It is also possible to estimate the progress point in consideration of operating environment, such as air temperature, weather, and the like, using an air temperature sensor and a humidity sensor. Furthermore, the life of the engine is not simply determined based on how long a certain rotation number (r.p.m., for example) has been used. The use at the temperature according to the design reduces the life due to wear and the like because there are mechanical stresses due to temperature change given by the number of times of starting the engine and the thermal expansion of each part due to the temperature and the like for actual usage. The load on the engine, rotation variation (rotation fluctuation), the state of oil, and the like, influence one another. Thus, wear and metal fatigue are accumulated. Accordingly, it is also possible to set a map or a calculation formula for estimating each influence based on values and the like which have been theoretically or experimentally obtained, to calculate the current progress state of time-dependent deterioration within the endurance period based on the calculation formula, and to make expression using the face, action, or the like of a person according to the age.

(3-2) Moreover, in the aforementioned preferred embodiment, the temporary loaded state of the engine 5, which is an industrial product, is detected. However, what is detected is not necessarily a loaded state as long as it is a temporary state and, for example, may be the remaining amount of fuel, the "on" and "off" of a light, or the like, which is temporary at a certain time point.

(4) Furthermore, the progress point may be estimated in consideration of problems (including failures) such as a malfunction of the product including parts, the accumulation of carbon in an exhaust system, improper combustion due to dirt of an ignition plug or an injector, the occurrence of knocking due to the fact that fuel having an appropriate octane value is not used, power down due to rotation variation or a knock sensor. For example, a problem can be represented by a pseudo living matter that is bandaged or using a cane.

(5) Further, in the aforementioned preferred embodiment, the case where a pseudo living matter is displayed on part of a two-wheeled motor vehicle has been described. However, in addition to computers, home electric appliances, daily necessities, and the like, movable bodies including airplanes, vehicles, ships, and the like may be adopted as long as they are so-called industrial products.

(6) Moreover, the work of recording and installing the program (p) on the system 50 in the aforementioned embodiment can also be performed by utilizing a recording medium, such as a CD-ROM, DVD, or other computer data memory device on which the program (p) readable by the system 50 is recorded.

(7) Furthermore, in the aforementioned preferred embodiment, each step has been described to be capable of being executed by software of the program (p). However, each step is not limited to this, and part of each step or part of a detailed process in each step may be executed by hardware of an existing circuit, sensor, or the like.

While preferred embodiments of the invention have been described above, it is to be understood that variations and modifications will be apparent to those skilled in the art without departing the scope and spirit of the invention. The scope of the invention, therefore, is to be determined solely by the following claims.

The invention claimed is:

1. A product state display system for displaying a state of an industrial product, of which operating state is changeable, on a display device by using a pseudo living matter, the product state display system comprising:

a pseudo living matter data management unit for managing, in order to represent a temporary state of the industrial product by an expression of the pseudo living matter, data of a plurality of the pseudo living matters showing expressions corresponding to the temporary state;

a state detector for detecting the temporary state;

a pseudo living matter data readout unit for reading the data of the pseudo living matter showing the expression corresponding to the temporary state detected by the state detector, out of the data of the plurality of pseudo living matters managed by the pseudo living matter data management unit; and a display unit for displaying the pseudo living matter showing the expression corresponding to the temporary state which has been detected, on the display device based on the read data of the pseudo living matter, wherein the expression of the pseudo living matter indicating the temporary state of the industrial product includes at least one of the pseudo living matter being bandaged and the pseudo living matter using a cane.

2. The system according to claim 1, wherein the industrial product is one of a vehicle, a computer, an electric appliance and a part of an industrial product.

3. The product state display system according to claim 1, wherein the temporary state of the industrial product is one of a temporary loaded state and a trouble condition of the industrial product.

4. The system according to claim 1, wherein the temporary state is measured with at least one of an engine temperature sensor, a throttle opening sensor, an oil viscosity sensor, a tachometer, a water temperature gauge, an oxygen sensor, an engine knocking occurrence sensor, an air temperature sensor and a humidity sensor, and an engine rotation gauge determining at least one of an angular rotation acceleration, a rotation number and a rotation variation.

5. A product state display system for displaying a state of an industrial product, of which operating state is changeable, on a display device by using a pseudo living matter, the product state display system comprising:

a pseudo living matter data management unit for managing, in order to represent a progress state of time-dependent deterioration of the industrial product within an endurance period by an aging state of the pseudo living matter, data of a plurality of the pseudo living matters showing aging states corresponding to the progress state;

a state determination unit for determining the progress state of the time-dependent deterioration of the industrial product;

a pseudo living matter data readout unit for reading the data of the pseudo living matter showing the aging state corresponding to the progress state determined by the state determination unit, out of the data of the plurality of pseudo living matters managed by the pseudo living matter data management unit; and a display unit for displaying the pseudo living matter showing the aging state corresponding to the determined progress state, on the display device based on the read data of the pseudo living matter.

6. The system according to claim 5, wherein the industrial product is a vehicle including an engine, and the aging state is an aging state of the engine.

7. The system according to claim 5, wherein the industrial product is one of a vehicle, a computer, an electric appliance and a part of an industrial product.

8. The system according to claim 5, wherein the aging state is displayed via the pseudo living matter on the display device by displaying an aging state of at least one of a human, a flower, and an animal.

9. The system according to claim 5, wherein the aging state of the pseudo living matter is indicated by at least one of a face of the pseudo living matter, a body shape of the pseudo living matter, wrinkles on a face of the pseudo living matter, spots on a face of the pseudo living matter, skin radiance of the pseudo living matter, a hair style of the pseudo living matter, a hair color of the pseudo living matter, a hair volume of the pseudo living matter, an audible voice of the pseudo living matter, and a speed of a moving image of the pseudo living matter.

10. The product state display system according to claim 5, wherein the state determination unit comprises:
a progress degree estimation unit for estimating, based on the temporary loaded state of the industrial product detected by the state detection unit, a degree of progress of the time-dependent deterioration of the industrial product which has progressed due to the relevant temporary loaded state;
a progress degree accumulation unit for accumulating the degree of the progress estimated by the progress degree estimation unit; and
a progress state estimation unit for estimating the progress state of the time-dependent deterioration of the industrial product based on the total degree of the progress accumulated by the progress degree accumulation unit.

11. The product state display system according to claim 10, wherein the progress degree estimation unit refers to a relationship between the degree of the progress of the time-dependent deterioration of the industrial product and the temporary loaded state of the industrial product, which relationship has been previously set, and estimates the degree of the progress of the time-dependent deterioration based on the temporary loaded state of the industrial product.

12. A product state display system for displaying a state of an industrial product, of which operating state is changeable, on a display device by using a pseudo living matter, the product state display system comprising:
a pseudo living matter data management unit for managing, in order to represent a progress state of time-dependent deterioration of the industrial product within an endurance period by an aging state of the pseudo living matter and to represent a temporary state of the industrial product by an expression of the pseudo living matter, data of a plurality of the pseudo living matters showing expressions corresponding to the temporary state for each aging state corresponding to the progress state;
a state determination unit for determining the progress state of the time-dependent deterioration of the industrial product;
a state detection unit for detecting the temporary state of the industrial product;
a pseudo living matter data readout unit for reading the data of the pseudo living matter which is in the aging state corresponding to the progress state determined by the state determination unit and which shows the expression corresponding to the temporary state detected by the state detection unit, out of the data of the plurality of pseudo living matters managed by the pseudo living matter data management unit; and
a display unit for displaying the pseudo living matter which is in the aging state corresponding to the determined progress state and which shows the expression corresponding to the detected temporary state, on the display device based on the read data of the pseudo living matter.

13. A program on a computer readable medium for a product state display system for displaying a state of an industrial product, of which operating state is changeable, on a display device by using a pseudo living matter, the program being used in the product state display system and causing the product state display system to perform the steps of:
managing, in order to represent a progress state of time-dependent deterioration of the industrial product within an endurance period by an aging state of the pseudo living matter, data of a plurality of the pseudo living matters showing aging states corresponding to the progress state;
determining the progress state of the time-dependent deterioration of the industrial product;
reading the data of the pseudo living matter showing the aging state corresponding to the progress state determined by the determining step, out of the data of the plurality of pseudo living matters managed by the managing step; and
displaying the pseudo living matter showing the aging state corresponding to the determined progress state, on the display device based on the read data of the pseudo living matter.

14. A program on a computer readable medium for a product state display system for displaying a state of an industrial product, of which operating state is changeable, on a display device by using a pseudo living matter, the program being used in the product state display system and causing the product state display system to perform the steps of:
managing, in order to represent a progress state of time-dependent deterioration of the industrial product within an endurance period by an aging state of the pseudo living matter and to represent a temporary state of the industrial product by an expression of the pseudo living matter, data of a plurality of the pseudo living matters showing expressions corresponding to the temporary state for each aging state corresponding to the progress state;
determining the progress state of the time-dependent deterioration of the industrial product;
detecting the temporary state;
reading the data of the pseudo living matter which is in the aging state corresponding to the progress state determined by the determining step and which shows the expression corresponding to the temporary state detected by the detecting step, out of the data of the plurality of pseudo living matters managed by the managing step; and
displaying the pseudo living matter which is in the aging state corresponding to the determined progress state and which shows the expression corresponding to the detected temporary state, on the display device based on the read data of the pseudo living matter.

* * * * *